United States Patent
Nakajima et al.

(10) Patent No.: US 7,825,906 B2
(45) Date of Patent: Nov. 2, 2010

(54) COORDINATE DETECTING DEVICE

(75) Inventors: Takashi Nakajima, Shinagawa (JP); Koichi Kondoh, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 774 days.

(21) Appl. No.: 11/442,223

(22) Filed: May 30, 2006

(65) Prior Publication Data

US 2007/0013678 A1 Jan. 18, 2007

(30) Foreign Application Priority Data

Jul. 13, 2005 (JP) ............... 2005-204778

(51) Int. Cl.
*G06F 3/041* (2006.01)

(52) U.S. Cl. .................. 345/173; 345/174

(58) Field of Classification Search .............. None
See application file for complete search history.

(56) References Cited

U.S. PATENT DOCUMENTS 6,488,981 B1 * 12/2002 Richter et al. ............. 427/58
6,512,512 B1 * 1/2003 Blanchard .................. 345/173
2003/0184526 A1 * 10/2003 Nakajima et al. ........... 345/173

FOREIGN PATENT DOCUMENTS

| JP | 09-146682 | 6/1997 |
|----|-----------|--------|
| JP | 10-083251 | 3/1998 |
| JP | 2001-125724 | 5/2001 |

OTHER PUBLICATIONS

Japanese Office Action mailed Feb. 23, 2010 in corresponding Japanese Patent Application 2005-204778.

* cited by examiner

*Primary Examiner*—Alexander Eisen
*Assistant Examiner*—Robin Mishler
(74) *Attorney, Agent, or Firm*—Staas & Halsey LLP

(57) ABSTRACT

A coordinate detecting device is disclosed. The coordinate detecting device includes a resistance film, a common electrode which applies electric potential to the resistance film, a voltage supplying section which supplies a voltage to the common electrode, wiring which supplies the voltage to the voltage supplying section, an insulation film disposed between the common electrode and the resistance film, and an electric potential supplying section formed in the insulation film for supplying the electric potential from the common electrode to the resistance film. The coordinate detecting device detects a coordinate of a position on a panel when a user touches the position while an electric potential distribution is generated in the resistance film by being applied electric potential from the common electrode.

16 Claims, 12 Drawing Sheets

COORDINATE DETECTING DEVICE

BACKGROUND OF THE INVENTION

1. Field of the Invention

The present invention generally relates to a coordinate detecting device which detects a coordinate of an input position and outputs a signal corresponding to the detected coordinate.

2. Description of the Related Art

An input device in a computer system includes a touch panel. The touch panel is installed on a display, and when a user touches a position on the touch panel, the touch panel detects a coordinate position on the display and outputs a signal corresponding to the detected coordinate position.

There is a touch panel to which a user can directly input a predetermined command easily and intuitively.

As the touch panel, there are a resistance film type, an optical type, a capacity coupling type, and so on. Of these touch panels, the resistance film type is generally used because its structure is simple and its control system is easily realized. As to the resistance film type touch panel, there are a four-line type, a five-line type, an eight-line type, and so on, depending on disposition of electrodes on the resistance film.

When the five-line type touch panel is compared with the four-line type and the eight-line type touch panels, in the five-line type touch panel, since a conductive film on an upper substrate disposed at the operating surface side is used only for reading electric potential, a problem of edge sliding, which the four-line type and the eight-line type touch panels have, does not occur. Therefore, the five-line type touch panel is used in environments in which the touch panel is frequently used with hard touches and long-year durability is required.

FIG. 12 is an exploded perspective view of a conventional five-line type resistance film touch panel.

As shown in FIG. 12, a five-line type resistance film touch panel 1 includes an upper substrate 11 and a lower substrate 12. In the lower substrate 12, a transparent resistance film 22 is formed on all the surface of a glass substrate 21, and X axis coordinate detecting electrodes 23 and 24 and Y axis coordinate detecting electrodes 25 and 26 are formed on the transparent resistance film 22. In the upper substrate 11, a transparent resistance film 32 is formed on all the surface of a film substrate 31 and a coordinate detecting electrode 33 is formed on the transparent resistance film 32.

When a voltage is applied to the X axis coordinate detecting electrodes 23 and 24, an electric potential distribution is generated in the X axis direction in the transparent resistance film 22 of the lower electrode 12. At this time, by detecting electric potential of the transparent resistance film 32 of the upper substrate 11, an X coordinate at a position where the upper substrate 11 touches the lower substrate 12 can be detected. When a voltage is applied to the Y axis coordinate detecting electrodes 25 and 26, an electric potential distribution is generated in the Y axis direction in the transparent resistance film 22 of the lower electrode 12. At this time, by detecting electric potential of the transparent resistance film 32 of the upper substrate 11, a Y coordinate at a position where the upper substrate 11 touches the lower substrate 12 can be detected.

In this kind of touch panel, it is necessary to generate a uniform electric potential distribution in the transparent resistance film 22 of the lower electrode 12. In conventional technology, in order to make the electric potential distribution uniform in the transparent resistance film 22 of the lower substrate 12, a method in which electric potential distribution patterns are generated in plural stages around the transparent resistance film 22 is disclosed (for example, see Patent Document 1).

In addition, a method in which a common electrode is formed so as to surround an input surface is disclosed (for example, see Patent Document 2).

[Patent Document 1] Japanese Laid-Open Patent Application No. 10-83251

[Patent Document 1] Japanese Laid-Open Patent Application No. 2001-125724

A coordinate detecting device such as a touch panel is required to be small sized due to, for example, miniaturization of an apparatus to which the coordinate detecting device is installed. However, it is difficult for the conventional coordinate detecting device to make its size small due to the installation of the plural stages of the electric potential distribution patterns around the transparent resistance film 22.

In addition, in the method in which the common electrode is formed so as to surround the input surface, when a resistance ratio between the transparent resistance film and pattern resistance is not large, the electric potential distribution of the transparent resistance film is distorted.

SUMMARY OF THE INVENTION

The present invention provides a coordinate detecting device having a small-sized structure, which can increase detecting accuracy of a coordinate position to be detected.

According to an aspect of the present invention, there is provided a coordinate detecting device. The coordinate detecting device includes a resistance film, a common electrode which applies electric potential to the resistance film, a voltage supplying section which supplies a voltage to the common electrode, wiring which supplies the voltage to the voltage supplying section, an insulation film disposed between the common electrode and the resistance film, and an electric potential supplying section formed in the insulation film for supplying the electric potential from the common electrode to the resistance film. The coordinate detecting device detects a coordinate of a position on a panel when a user touches the position while an electric potential distribution is generated in the resistance film by being applied electric potential from the common electrode. Further, the wiring is stacked on the common electrode via another insulation film.

According to embodiments of the present invention, the electric potential supplying section is formed in the insulation film disposed between the common electrode and the resistance film for supplying the electric potential from the common electrode to the resistance film. Further, the electric potential supplying section includes openings. Therefore, when the number, and/or the size, and/or the shape of the openings is changed, the electric potential distribution in the resistance film can be determined as a suitable distribution. For example, when the shape of the openings is determined so that the electric potential distribution in the resistance film becomes uniform, detecting accuracy of a coordinate can be increased. Further, since the wiring is stacked on the common electrode via another insulation film, the size of the device can be made small.

The features and advantages of the present invention will be apparent from the following detailed description when read in conjunction with the accompanying drawings.

DESCRIPTION OF THE PREFERRED EMBODIMENTS

Figure 1:
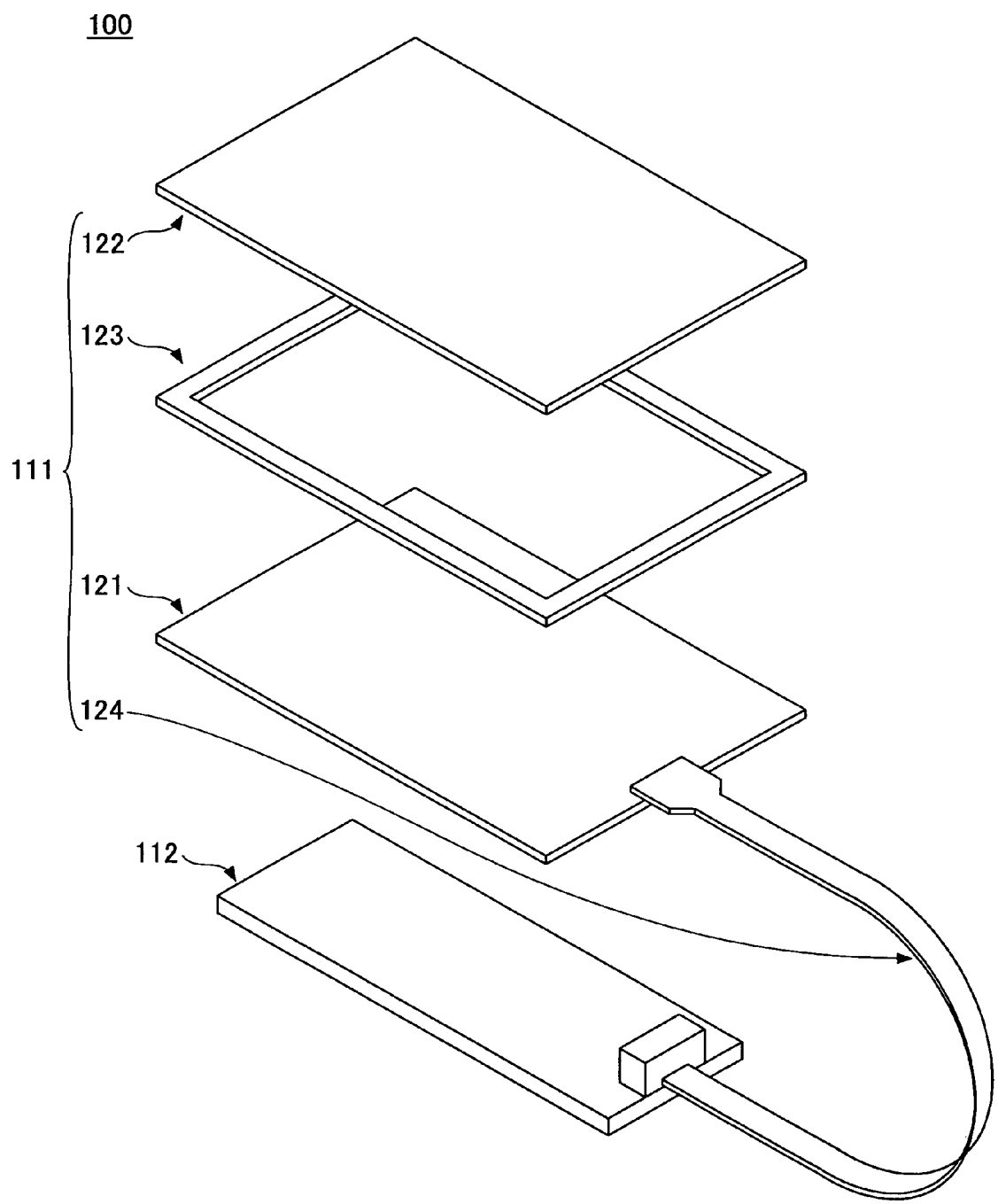
FIG. 1 is an exploded perspective view of a coordinate detecting device according to a first embodiment of the present invention.

Referring to the drawings, embodiments of the present invention are described.

First Embodiment

[Structure of Coordinate Detecting Device]

FIG. 1 is an exploded perspective view of a coordinate detecting device according to a first embodiment of the present invention.

In the first embodiment, as a coordinate detecting device 100, a five-line type analog resistance film touch panel is used. The coordinate detecting device 100 includes a panel section 111 and an interface board 112.

The panel section 111 includes a lower substrate 121, an upper substrate 122, a spacer 123, and an FPC (flexible print cable) 124. In the exemplary embodiment, the lower substrate 121 is bonded to the upper substrate 122 via the spacer 123. The spacer 123 is an insulating double sided adhesive tape and bonds the lower substrate 121 to the upper substrate 122 to provide a predetermined space between the lower substrate 121 and the upper substrate 122 at a part other than the spacer 123. The FPC 124 has a structure in which first wiring through fifth wiring (not shown) are formed on a flexible print board (not shown) and is connected to the lower substrate 121 by using, for example, an anisotropic conductive film by thermo compression bonding. Further, the FPC 124 is connected to the interface board 112.

[Lower Substrate 121]

Figure 2A:
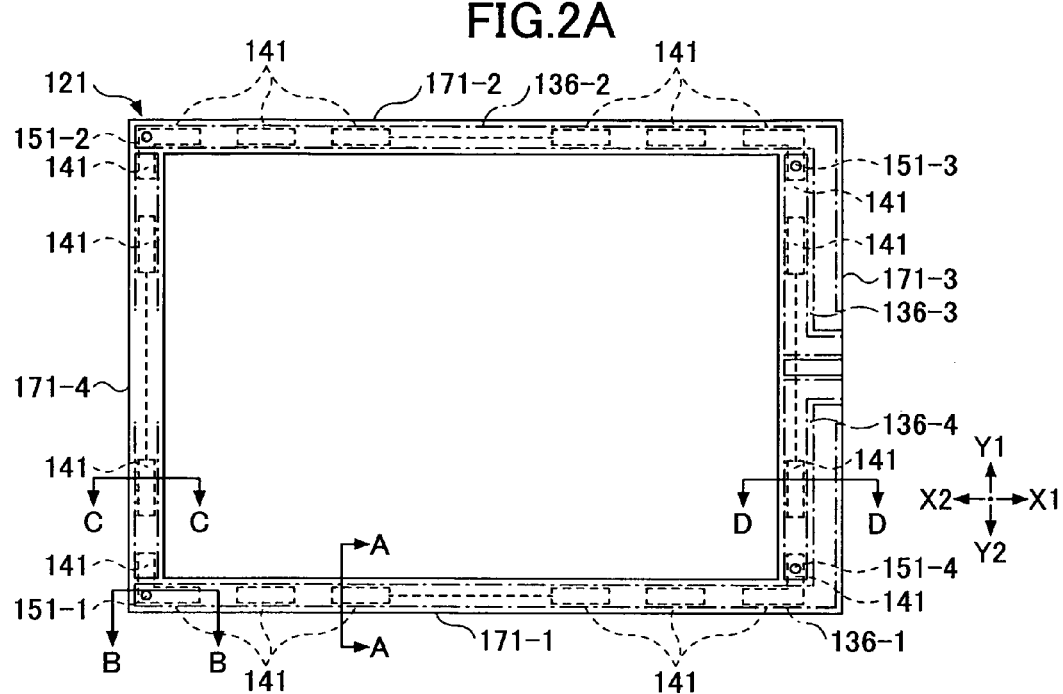
FIG. 2A is a plan view of a lower substrate shown in FIG. 1.
Figure 2B:
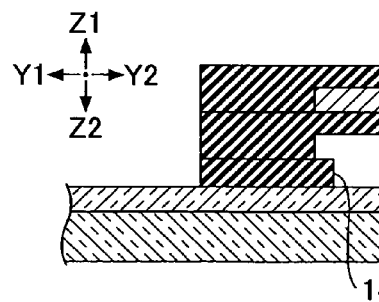
FIG. 2B is a cross-sectional view of the lower substrate along line A-A of FIG. 2A.
Figure 2C:
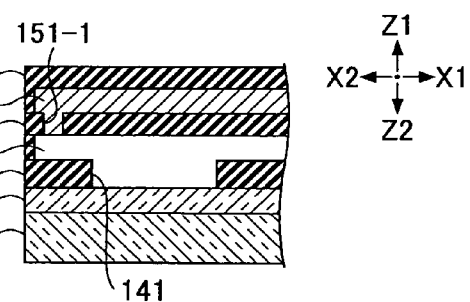
FIG. 2C is a cross-sectional view of the lower substrate along line B-B of FIG. 2A.
Figure 2D:
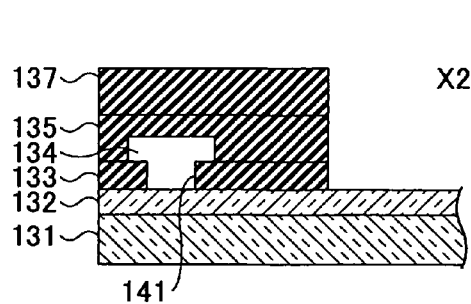
FIG. 2D is a cross-sectional view of the lower substrate along line C-C of FIG. 2A.
Figure 2E:
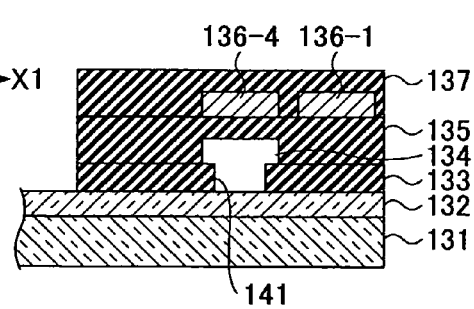
FIG. 2E is a cross-sectional view of the lower substrate along line D-D of FIG. 2A.

FIG. 2A is a plan view of the lower substrate 121 shown in FIG. 1. FIG. 2B is a cross-sectional view of the lower substrate 121 along line A-A of FIG. 2A. FIG. 2C is a cross-sectional view of the lower substrate 121 along line B-B of FIG. 2A. FIG. 2D is a cross-sectional view of the lower substrate 121 along line C-C of FIG. 2A. FIG. 2E is a cross-sectional view of the lower substrate 121 along line D-D of FIG. 2A.

Referring to FIGS. 2A through 2E, the lower substrate 121 is described. The lower substrate 121 includes a glass substrate 131, a transparent resistance film 132, a first insulation film 133, a common electrode 134, first wiring 136-1 through fourth wiring 136-4, and a third insulation film 137.

The transparent resistance film 132 is formed on the surface of the glass substrate 131 by depositing, for example, ITO (indium tin oxide). The transparent resistance film 132 transmits light and has a predetermined resistance value.

[First Insulation Film 133]

The first insulation film 133 is formed on the edge parts of the glass substrate 131 via the transparent resistance film 132. Openings 141 are formed in the first insulation film 133 and are electric potential supplying sections formed in the edge parts of the lower substrate 121.

[Openings 141]

The openings 141 are formed in the first insulation film 133 so that an area at which the transparent resistance film 132 contacts the common electrode 134 becomes relatively large at both the end parts of a first side 171-1, a second side 171-2, a third side 171-3, and a fourth side 171-4 of the lower substrate 121, and becomes relatively small at the center parts of the first side 171-1, the second side 171-2, the third side 171-3, and the fourth side 171-4.

Figure 3:
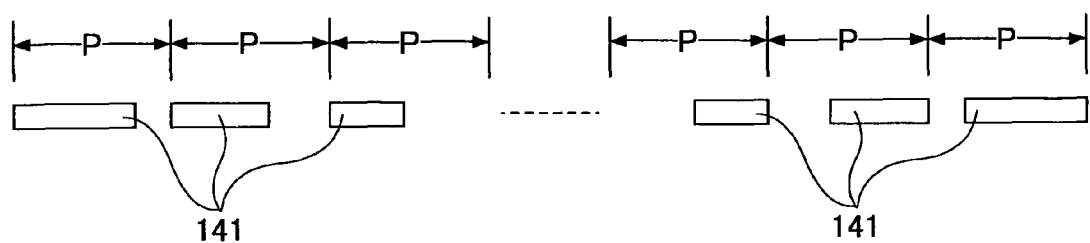
FIG. 3 is a plan view of openings shown in FIGS. 2A through 2E.

FIG. 3 is a plan view of the openings 141 formed in the first insulation film 133 at each of the sides 171-1 through 171-4 shown in FIG. 2A through 2E.

As shown in FIG. 3, a pitch P between the openings 141 is the same but the length of the openings 141 in the side direction gradually becomes large as the openings 141 get near both the end parts of the first side 171-1 through the fourth side 171-4. In FIG. 3, the first side 171-1 through the fourth side 171-4 are not shown.

By the above structure, at both the end parts of the first side 171-1 through the fourth side 171-4 where the electric potential distribution is likely to be distorted, the change of the electric potential of the common electrode 134 can largely reflect the transparent resistance film 132. Therefore, the distortion of the electric potential distribution at both the end parts of the first side 171-1 through the fourth side 171-4 is reduced, and the electric potential distribution of the transparent resistance film 132 is made more uniform. With this, accurate coordinate detection can be realized.

The shapes and the disposition of the openings 141 are not limited to those shown in FIG. 3. That is, the area at which the transparent resistance film 132 contacts the common electrode 134 becomes relatively large at both the end parts of the first side 171-1 through the fourth side 171-4 of the lower substrate 121 and becomes relatively small at the center parts of the first side 171-1 through the fourth side 171-4.

[First Modified Example of Openings 141]

Figure 4A:
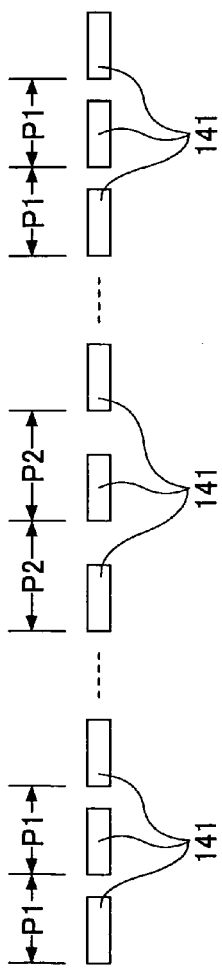
FIG. 4A is a plan view of a first modified example of the openings shown in FIG. 3.

FIG. 4A is a plan view of a first modified example of the openings 141. As shown in FIG. 4A, the openings 141 have the same shape but the pitch P1 at the end parts of the first side 171-1 through the fourth side 171-4 is relatively small and the pitch P2 at the center parts of the first side 171-1 through the fourth side 171-4 is relatively large. Therefore, the distortion of the electric potential distribution at both the end parts of the first side 171-1 through the fourth side 171-4 is reduced and the electric potential distribution of the transparent resistance film 132 is made more uniform. With this, accurate coordinate detection can be realized. In FIG. 4A, the first side 171-1 through the fourth side 171-4 are not shown.

[Second Modified Example of Openings 141]

Figure 4B:
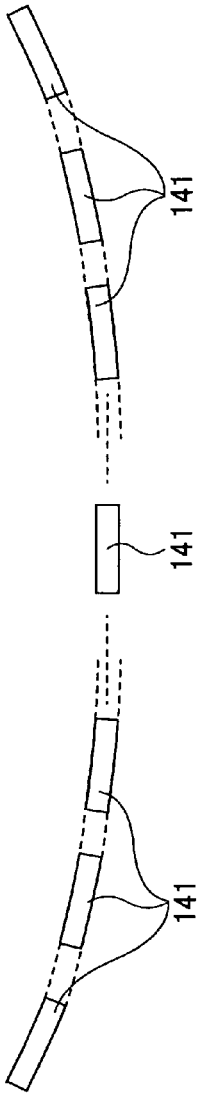
FIG. 4B is a plan view of a second modified example of the openings shown in FIG. 3.

FIG. 4B is a plan view of a second modified example of the openings 141. As shown in FIG. 4B, the openings 141 are curved in the inside direction at both the end parts of the first side 171-1 through the fourth side 171-4. That is, the openings 141 get closer together at both the end parts of the first side 171-1 through the fourth side 171-4 and further apart at the center parts. Then the same result can be obtained. Therefore, the distortion of the electric potential distribution at both the end parts of the first side 171-1 through the fourth side 171-4 is reduced and the electric potential distribution of the transparent resistance film 132 is made more uniform. With this, accurate coordinate detection can be realized. In FIG. 4B, the first side 171-1 through the fourth side 171-4 are not shown.

In FIG. 4B, as shown in dashed lines, one long opening 141 is formed for one side of the first side 171-1 through the fourth side 171-4 and is curved in the inside direction. This shape and disposition are also possible.

Further, the shape of the openings 141 is formed so that the inner side thereof is curved and enlarged. This shape is also possible.

[Third Modified Example of Openings 141]

Figure 4C:
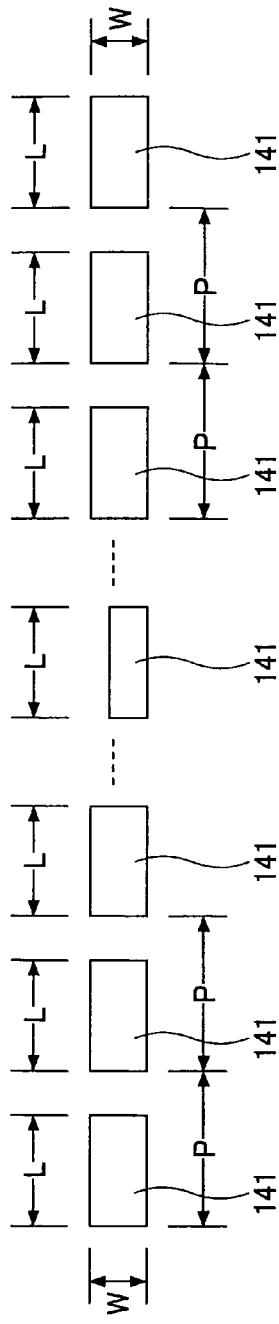
FIG. 4C is a plan view of a third modified example of the openings shown in FIG. 3.

FIG. 4C is a plan view of a third modified example of the openings 141. As shown in FIG. 4C, the openings 141 are formed having the same pitch P and the same length L, but the width W is relatively large at both the end parts of the first side 171-1 through the fourth side 171-4 and the width is relatively small at the center parts. By this structure, the distortion of the electric potential distribution at both the end parts of the first side 171-1 through the fourth side 171-4 is reduced and the electric potential distribution of the transparent resistance film 132 is made more uniform. With this, accurate coordinate detection can be realized. In FIG. 4C, the first side 171-1 through the fourth side 171-4 are not shown.

[Fourth Modified Example of Openings 141]

Figure 4D:
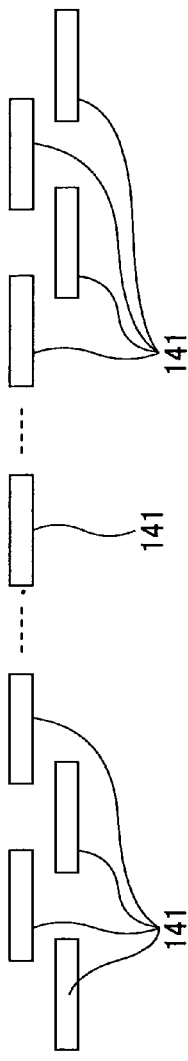
FIG. 4D is a plan view of a fourth modified example of the openings shown in FIG. 3.

FIG. 4D is a plan view of a fourth modified example of the openings 141. As shown in FIG. 4D, the openings 141 are formed having the same length and the same width but the number of openings 141 is large at both the end parts of the first side 171-1 through the fourth side 171-4 and is small at the center part thereof. By this structure, the distortion of the electric potential distribution at both the end parts of the first side 171-1 through the fourth side 171-4 is reduced and the electric potential distribution of the transparent resistance film 132 is made more uniform. With this, accurate coordinate detection can be realized. In FIG. 4D, the first side 171-1 through the fourth side 171-4 are not shown.

In FIG. 4D, the openings 141 are disposed double at both the end parts of the first side 171-1 through the fourth side 171-4. However, the openings 141 can be disposed in a triple state or more.

[Common Electrode 134]

The common electrode 134 is made of, for example, Ag–C and is formed on the first insulation film 133. Such formation of the common electrode 134 includes filling the openings 141.

[Second Insulation Film 135]

The second insulation film 135 is stacked on the first insulation film 133 to cover the common electrode 134. A first through hole 151-1 through a fourth through hole 151-4 are formed in the second insulation film 135 at corresponding four corners of the lower substrate 121, respectively. The first through hole 151-1 through the fourth through hole 151-4 form voltage supplying sections which supply a voltage from the first wiring 136-1 through the fourth wiring 136-4 to the common electrode 134.

[First Through Fourth Wirings 136-1 Through 136-4]

Referring to FIG. 2, the first wiring 136-1 through the fourth wiring 136-4 are described. The first wiring 136-1 is made of a low resistance material, for example, Ag, and is formed on the second insulation film 135 along the first side 171-1 of the lower substrate 121. One end of the first wiring 136-1 is formed to fill the first through hole 151-1 formed in the second insulation film 135. The other end of the first wiring 136-1 is connected to the first wiring of the FPC 124 (see FIG. 1).

The second wiring 136-2, is made of a low resistance material, for example, Ag, and is formed on the second insulation film 135 along the second side 171-2 facing the first side 171-1 of the lower substrate 121. One end of the second wiring 136-2 is formed to fill the second through hole 151-2 formed in the second insulation film 135. The other end of the second wiring 136-2 is connected to the second wiring of the FPC 124 (see FIG. 1).

The third wiring 136-3 is made of a low resistance material, for example, Ag, and is formed on the second insulation film 135 along the half of the third side 171-3 orthogonal to the first side 171-1 and the second side 171-2, at the side of the second side 171-2. One end of the third wiring 136-3 is formed to fill the third through hole 151-3 formed in the second insulation film 135. The other end of the third wiring 136-3 is connected to the third wiring of the FPC 124 (see FIG. 1).

The fourth wiring 136-4 is made of a low resistance material, for example, Ag, and is formed on the second insulation film 135 along the half of the third side 171-3 orthogonal to the first side 171-1 and the second side 171-2, at the side of the first side 171-1. One end of the fourth wiring 136-4 is formed to fill the fourth through hole 151-4 formed in the second insulation film 135. The other end of the fourth wiring 136-4 is connected to the fourth wiring of the FPC 124 (see FIG. 1).

The third insulation film 137 is formed on the second insulation film 135 to cover the first wiring 136-1 through the fourth wiring 136-4. The upper substrate 122 is bonded on the third insulation film 137 of the lower substrate 121 via the spacer 123 (see FIG. 1).

[Upper Substrate 122]

Figure 5A:
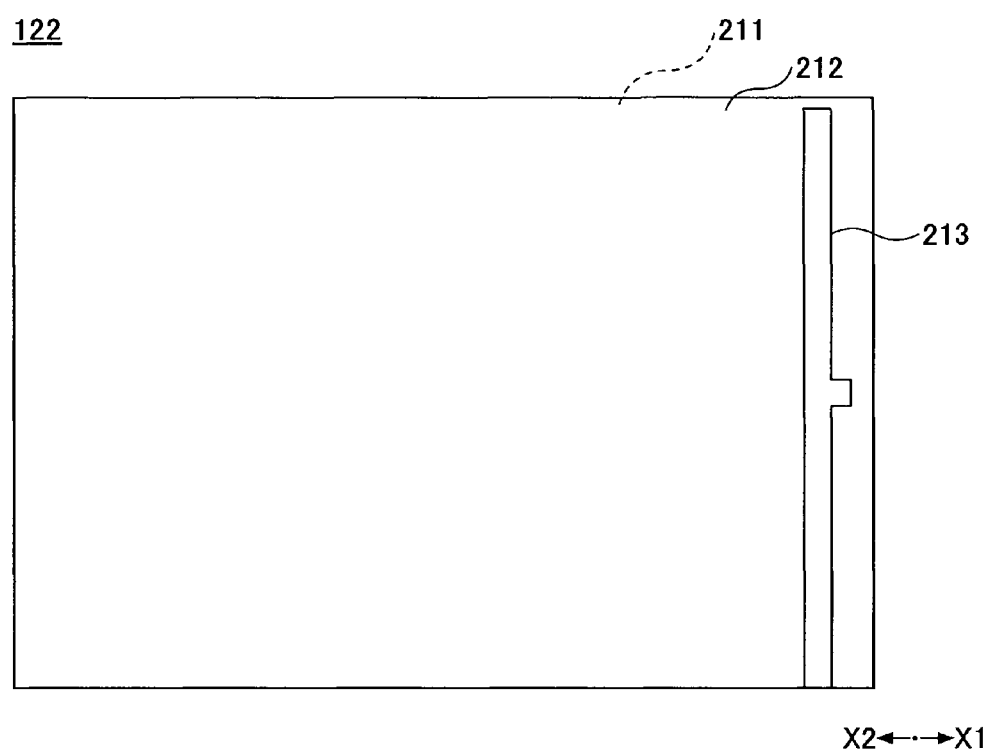
FIG. 5A is a plan view of an upper substrate shown in FIG. 1.
Figure 5B:
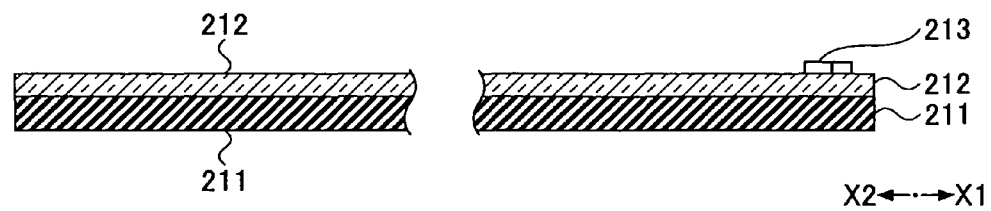
FIG. 5B is a side view of the upper substrate shown in FIG. 1.

FIG. 5A is a plan view of the upper substrate 122 shown in FIG. 1 and FIG. 5B is a side view of the upper substrate 122.

As shown in FIGS. 5A and 5B, the upper substrate 122 includes a film substrate 211, a transparent resistance film 212, and an electrode 213.

The film substrate 211 is made of a resin film having flexibility, for example, PET. The transparent resistance film 212 is formed on the surface of the film substrate 211 which surface faces the lower substrate 121. The transparent resistance film 212 is made of a transparent conductive material, for example, ITO. The electrode 213 is disposed at an end portion on the transparent resistance film 212 of the upper substrate 122 in the X1 direction, and is connected to the fifth wiring of the FPC 124 via a contact (not shown). A coordinate position is detected by detecting electric potential on the upper substrate 122 by the interface board 112.

[Operations]

Figure 6:
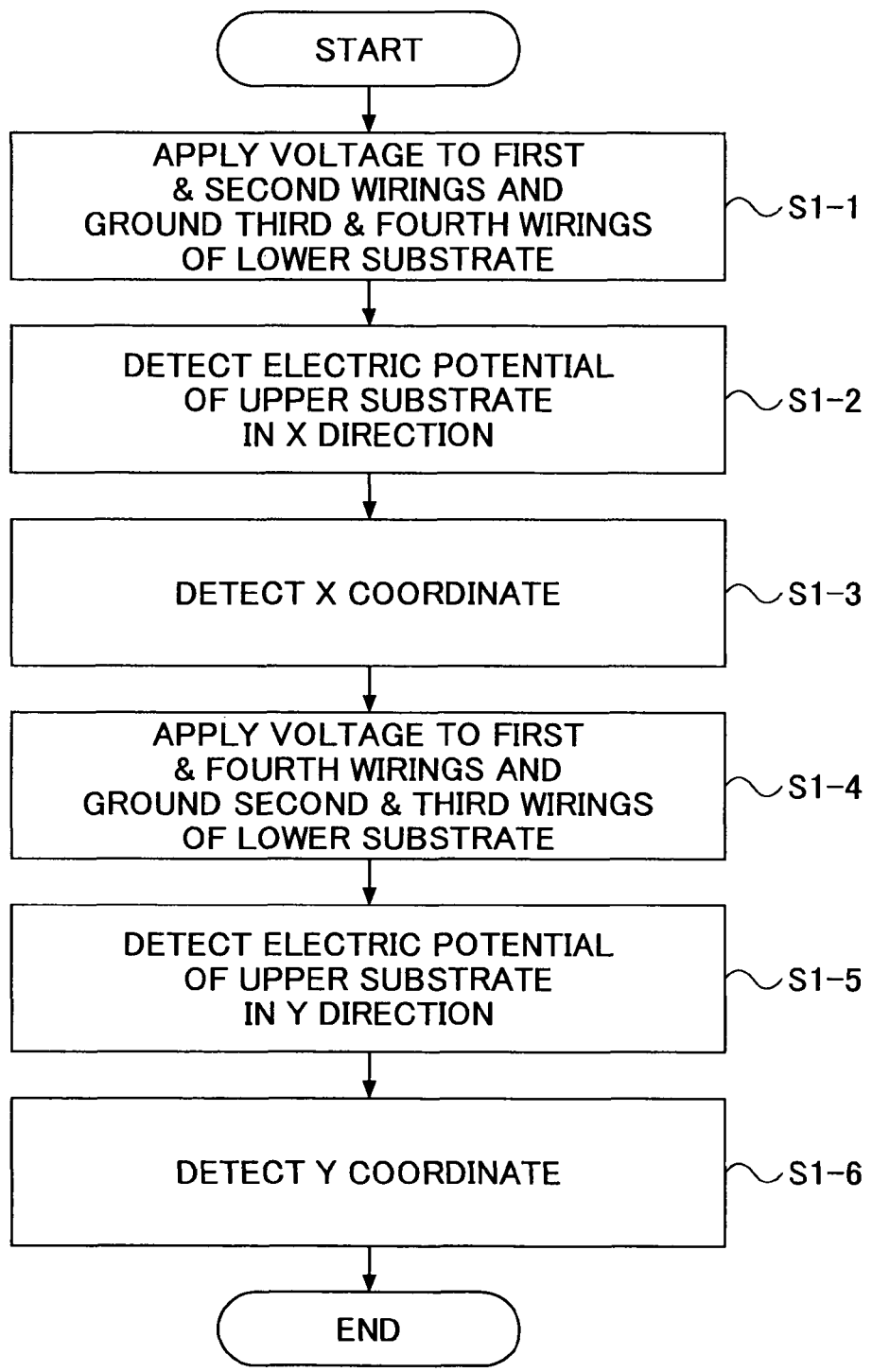
FIG. 6 is a flowchart showing operations of an interface board shown in FIG. 1.
Figure 7A:
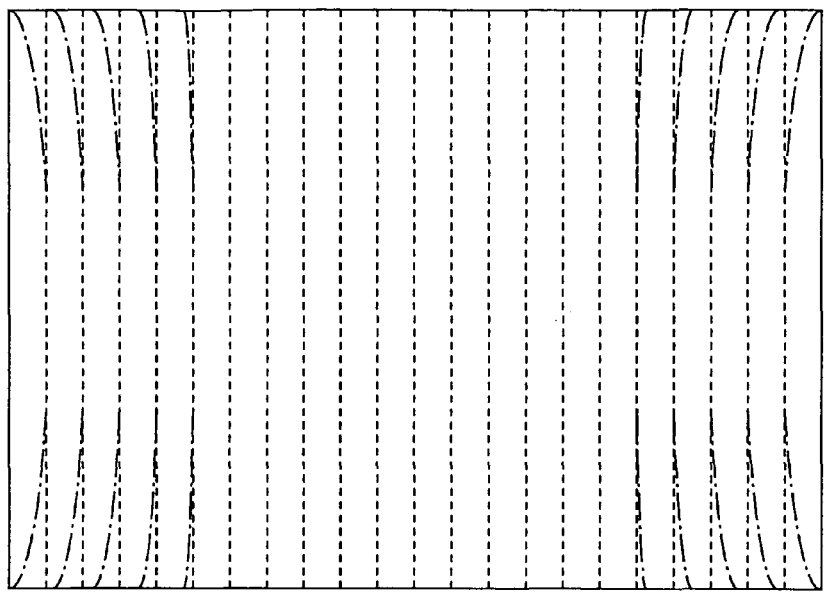
FIG. 7A is a diagram showing an electric potential distribution of the lower substrate when an X coordinate is detected.
Figure 7A:
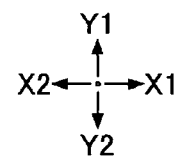
Figure 7B:
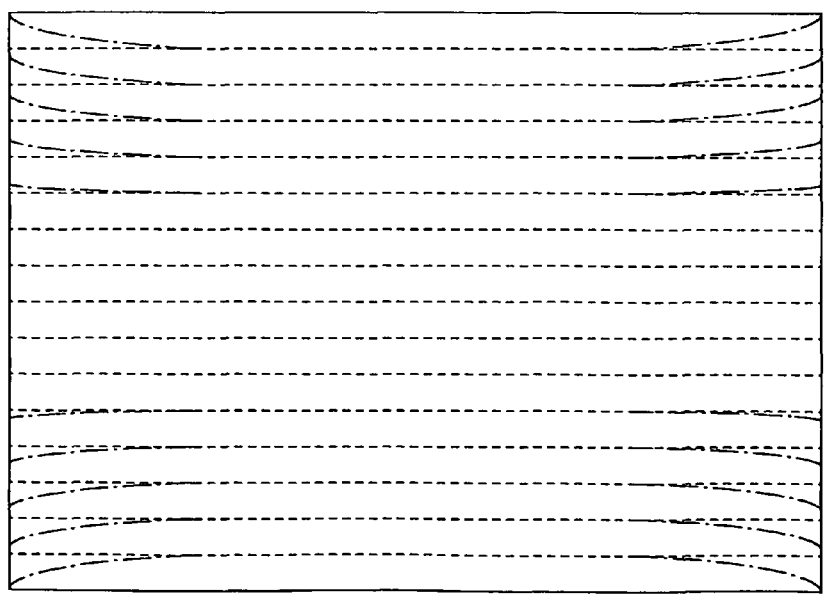
FIG. 7B is a diagram showing an electric potential distribution of the lower substrate when a Y coordinate is detected.

FIG. 6 is a flowchart showing operations of the interface board 112. FIG. 7A is a diagram showing an electric potential distribution of the lower substrate 121 when an X coordinate is detected. FIG. 7B is a diagram showing an electric potential distribution of the lower substrate 121 when a Y coordinate is detected.

Referring to FIGS. 6, 7A and 7B, the operations of the interface board 112 are described. First, the interface board 112 applies a voltage Vx to the first wiring 136-1 and the second wiring 136-2 and grounds the third wiring 136-3 and the fourth wiring 136-4 (step S1-1). With this, a uniform electric potential distribution shown in dashed lines of FIG. 7A can be generated in the transparent resistance film 132. In this, an electric potential distribution is distorted as shown in alternate long and short dash lines of FIG. 7A. Therefore, according to the present embodiment, accurate detection of an X coordinate can be performed.

Next, the interface board 112 detects electric potential of the upper substrate 122 in the X direction (step S1-2), and detects an X coordinate corresponding to the detected electric potential of the upper substrate 122 (step S1-3).

After this, the interface board 112 applies a voltage Vy to the first wiring 136-1 and the fourth wiring 136-4 and grounds the second wiring 136-2 and the third wiring 136-3 (step S1-4). With this, a uniform electric potential distribution shown in dotted lines of FIG. 7B can be generated in the transparent resistance film 132. In this, an electric potential distribution is distorted as shown in alternate long and short dash lines of FIG. 7B. Therefore, according to the present embodiment, accurate detection of a Y coordinate can be performed.

Next, the interface board 112 detects electric potential of the upper substrate 122 in the Y direction (step S1-5), and detects a Y coordinate corresponding to the detected electric potential of the upper substrate 122 (step S1-6).

[Effects of Embodiment]

According to the present embodiment, since the first wiring 136-1 through the fourth wiring 136-4 are stacked on the common electrode 134 via the second insulation film 135, the panel section 111 can be made small.

In addition, since the electric potential distribution of the transparent resistance film 132 of the lower substrate 121, which is generated when an X coordinate or a Y coordinate is detected, can be made uniform in the detection region by the shapes and the disposition of the openings 141, accurate detection of a coordinate can be performed.

FIRST MODIFIED EXAMPLE OF FIRST EMBODIMENT

In a first modified example of the first embodiment of the present invention, a lower substrate 311 is different from the lower substrate 121 in the first embodiment.

Figure 8A:
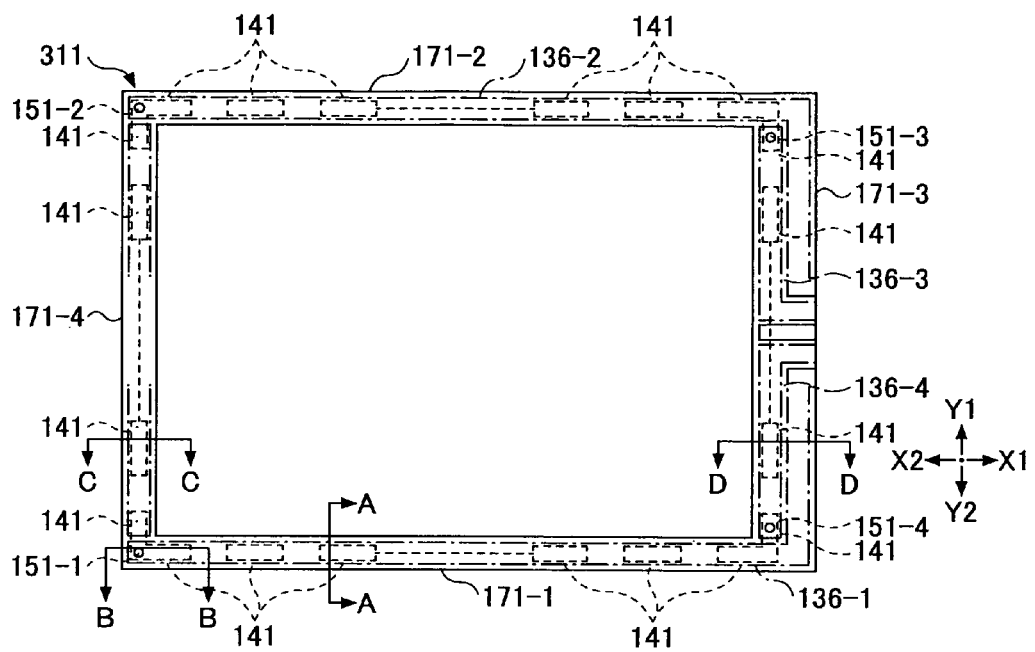
FIG. 8A is a plan view of a lower substrate according to a first modified example of the first embodiment of the present invention.
Figure 8B:
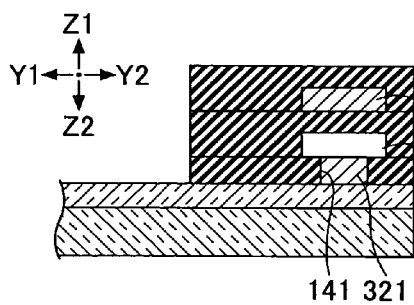
FIG. 8B is a cross-sectional view of the lower substrate along line A-A of FIG. 8A.
Figure 8C:
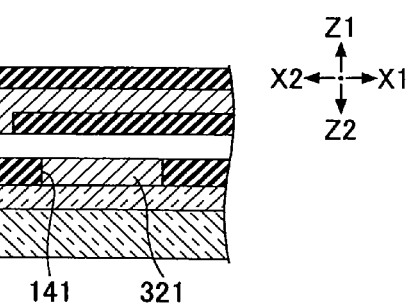
FIG. 8C is a cross-sectional view of the lower substrate along line B-B of FIG. 8A.
Figure 8D:
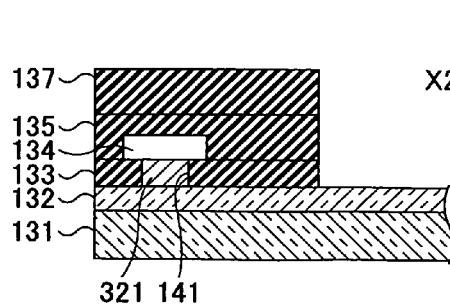
FIG. 8D is a cross-sectional view of the lower substrate along line C-C of FIG. 8A.
Figure 8E:
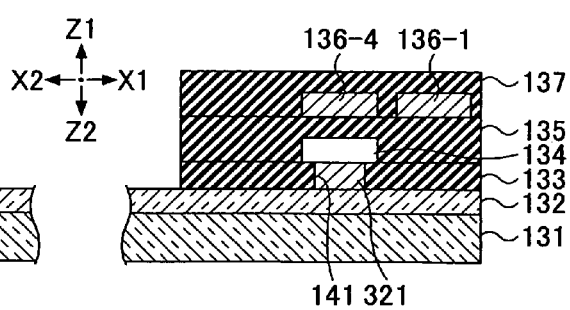
FIG. 8E is a cross-sectional view of the lower substrate along line D-D of FIG. 8A.

FIG. 8A is a plan view of the lower substrate 311 according to the first modified example of the first embodiment of the present invention. FIG. 8B is a cross-sectional view of the lower substrate 311 along line A-A of FIG. 8A. FIG. 8C is a cross-sectional view of the lower substrate 311 along line B-B of FIG. 8A. FIG. 8D is a cross-sectional view of the lower substrate 311 along line C-C of FIG. 8A. FIG. 8E is a cross-sectional view of the lower substrate 311 along line D-D of FIG. 8A.

As shown in FIGS. 8B through 8E, in the lower substrate 311, a low resistance layer 321 made of a low resistance material, for example, Ag, is formed in the openings 141. With this, the transparent resistance film 132 is connected to the common electrode 134 via the low resistance layer 321. Therefore, the connection between the transparent resistance film 132 and the common electrode 134 can be stabilized.

In addition, the resistance value of the common electrode 134 can be made high by the above stabilization. Therefore, current consumption in the common electrode 134 can be lowered and power consumption of the device can be reduced.

SECOND MODIFIED EXAMPLE OF FIRST EMBODIMENT

In a second modified example of the first embodiment of the present invention, a lower substrate 411 is different from the lower substrate 121 in the first embodiment.

Figure 9A:
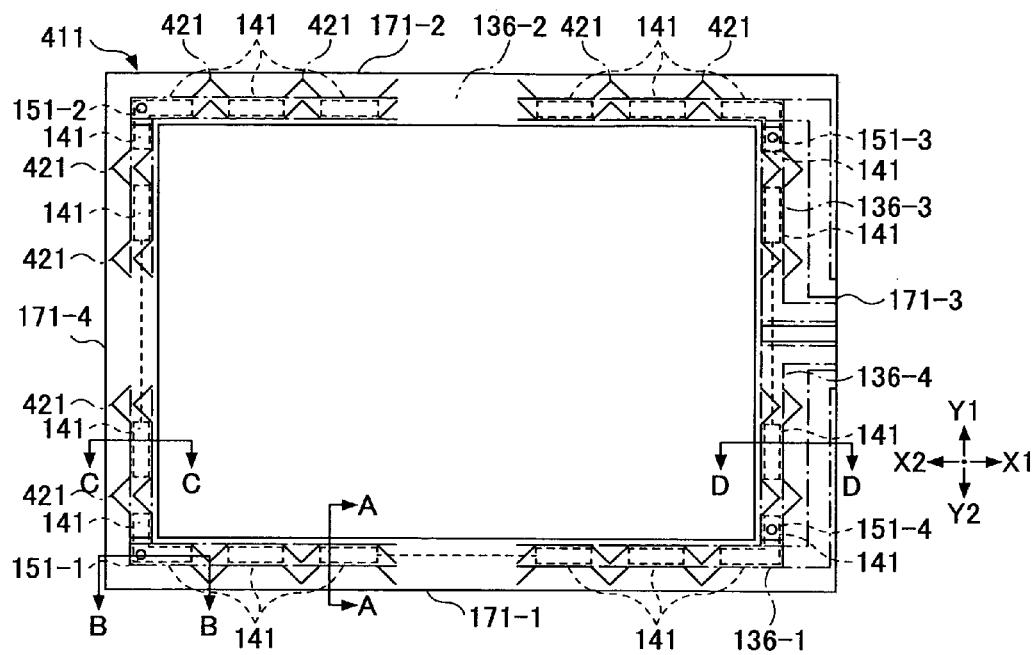
FIG. 9A is a plan view of a lower substrate according to a second modified example of the first embodiment of the present invention.
Figure 9B:
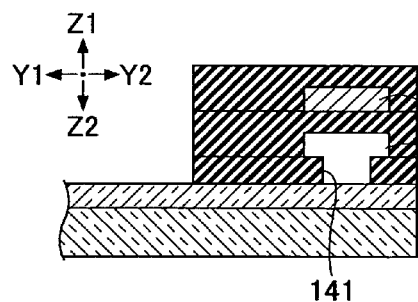
FIG. 9B is a cross-sectional view of the lower substrate along line A-A of FIG. 9A.
Figure 9C:
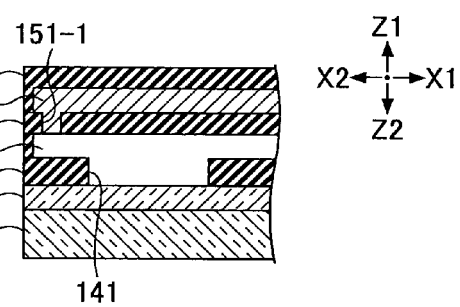
FIG. 9C is a cross-sectional view of the lower substrate along line B-B of FIG. 9A.
Figure 9D:
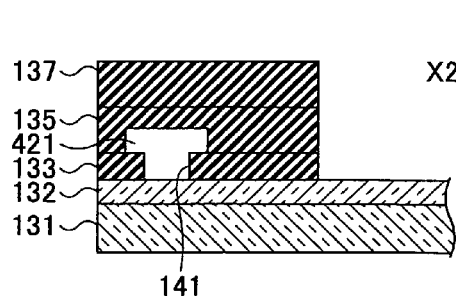
FIG. 9D is a cross-sectional view of the lower substrate along line C-C of FIG. 9A.
Figure 9E:
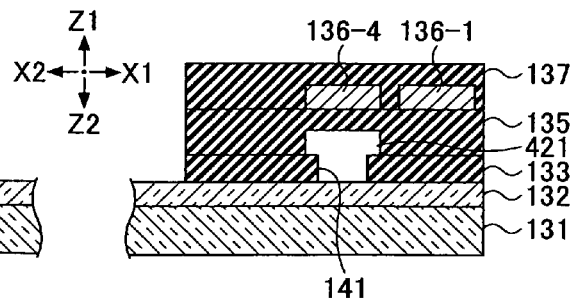
FIG. 9E is a cross-sectional view of the lower substrate along line D-D of FIG. 9A.

FIG. 9A is a plan view of the lower substrate 411 according to the second modified example of the first embodiment of the present invention. FIG. 9B is a cross-sectional view of the lower substrate 411 along line A-A of FIG. 9A. FIG. 9C is a cross-sectional view of the lower substrate 411 along line B-B of FIG. 9A. FIG. 9D is a cross-sectional view of the lower substrate 411 along line C-C of FIG. 9A. FIG. 9E is a cross-sectional view of the lower substrate 411 along line D-D of FIG. 9A.

As shown in FIGS. 9A through 9E, in the lower substrate 411, a common electrode 421 is different from the common electrode 134 in the first embodiment. As shown in FIG. 9A, the common electrode 421 is bent toward the outside between the openings 141. Since the length of the common electrode 421 can be larger by being bent, the resistance value of the common electrode 421 can be made larger. Therefore, current consumption in the common electrode 421 can be lowered and power consumption of the device can be reduced.

THIRD MODIFIED EXAMPLE OF FIRST EMBODIMENT

In a third modified example of the first embodiment of the present invention, a lower substrate 511 is different from the lower substrate 121 in the first embodiment.

Figure 10A:
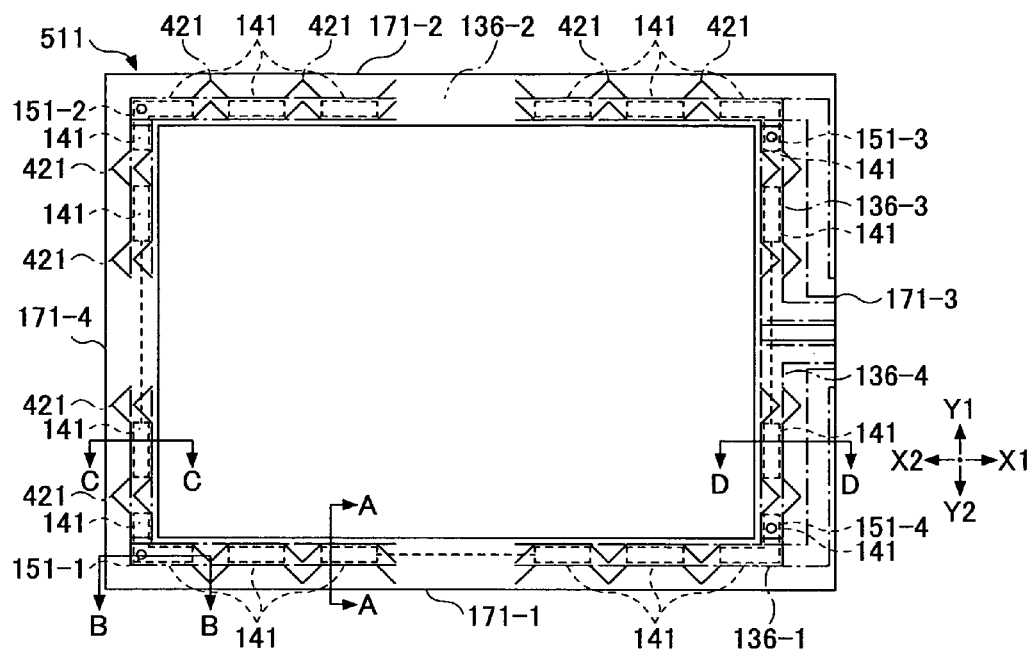
FIG. 10A is a plan view of a lower substrate according to a third modified example of the first embodiment of the present invention.
Figure 10B:
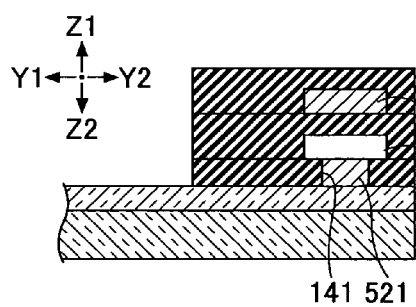
FIG. 10B is a cross-sectional view of the lower substrate along line A-A of FIG. 10A.
Figure 10C:
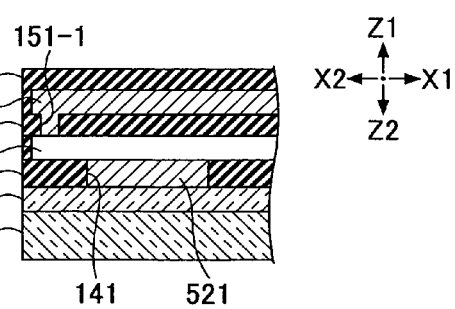
FIG. 10C is a cross-sectional view of the lower substrate along line B-B of FIG. 10A.
Figure 10D:
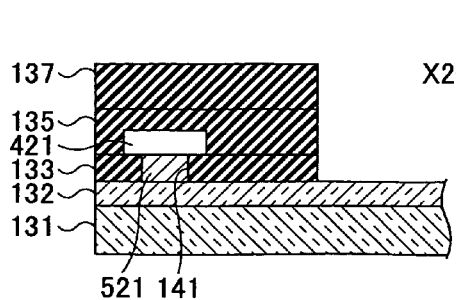
FIG. 10D is a cross-sectional view of the lower substrate along line C-C of FIG. 10A.
Figure 10E:
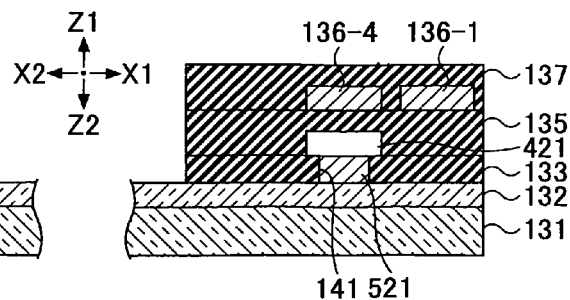
FIG. 10E is a cross-sectional view of the lower substrate along line D-D of FIG. 10A.

FIG. 10A is a plan view of the lower substrate 511 according to the third modified example of the first embodiment of the present invention. FIG. 10B is a cross-sectional view of the lower substrate 511 along line A-A of FIG. 10A. FIG. 10C is a cross-sectional view of the lower substrate 511 along line B-B of FIG. 10A. FIG. 10D is a cross-sectional view of the lower substrate 511 along line C-C of FIG. 10A. FIG. 10E is a cross-sectional view of the lower substrate 511 along line D-D of FIG. 10A.

As shown in FIGS. 10A through 10E, in the lower substrate 511, the common electrode 421 in the second modified example is used. In addition, a low resistance layer 521 made of a low resistance material, for example, Ag is formed in the openings 141. With this, the transparent resistance film 132 is connected to the common electrode 421 via the low resistance layer 521. Therefore, the connection between the transparent resistance film 132 and the common electrode 421 can be stabilized.

In addition, since the length of the common electrode 421 is relatively large, the resistance value of the common electrode 421 is relatively large. Therefore, current consumption in the common electrode 421 can be lowered and power consumption of the device can be reduced.

In the embodiments of the present invention, a five-line type analog resistance film touch panel is described. However, the present invention is not limited to a five-line type. The embodiments of the present invention can be applied to other types such as a four-line type, an eight-line type, and so on.

[Manufacturing Process]

Figure 11:
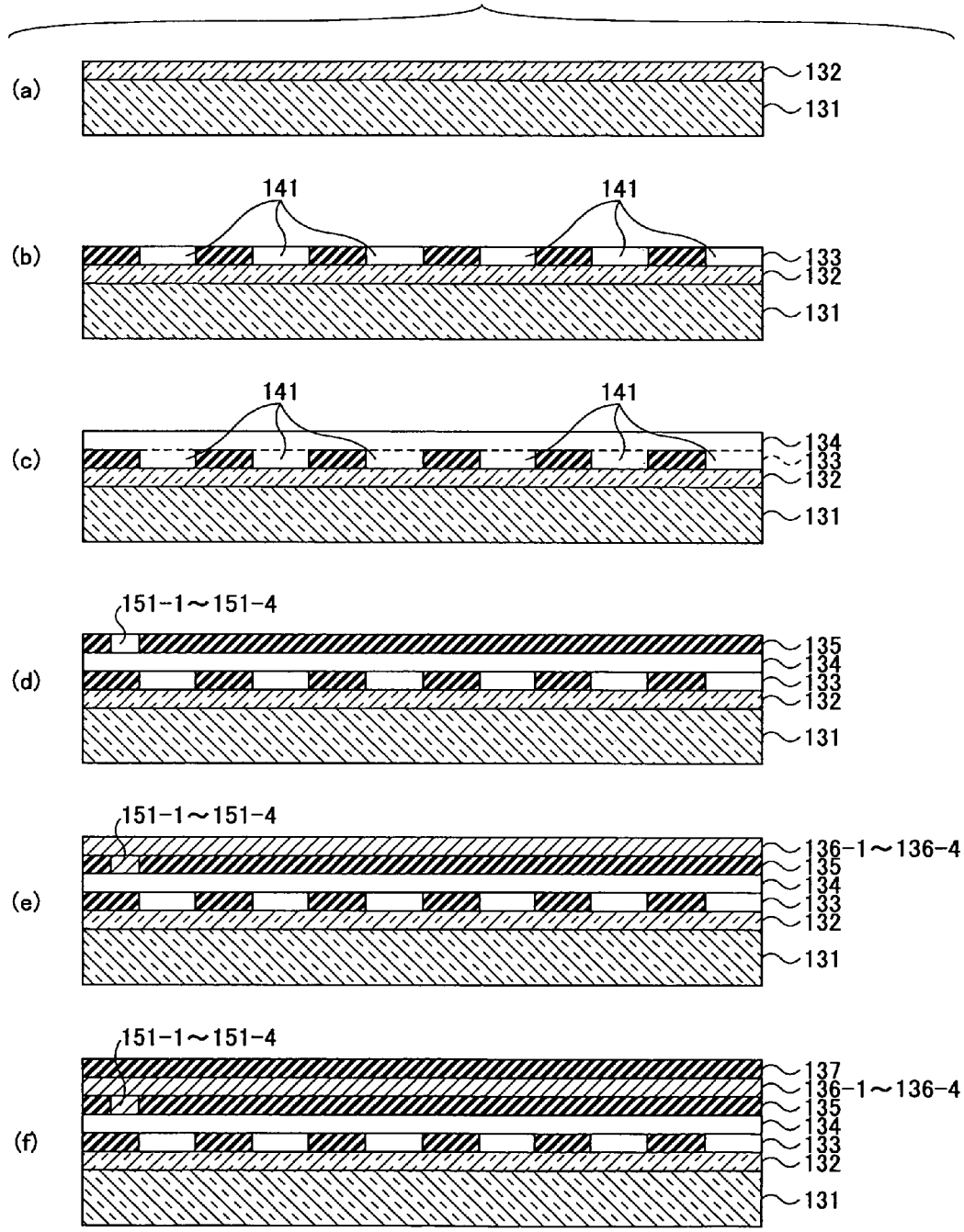
FIG. 11 is a diagram showing a manufacturing process of the lower substrate according to the first embodiment of the present invention.
Figure 12:
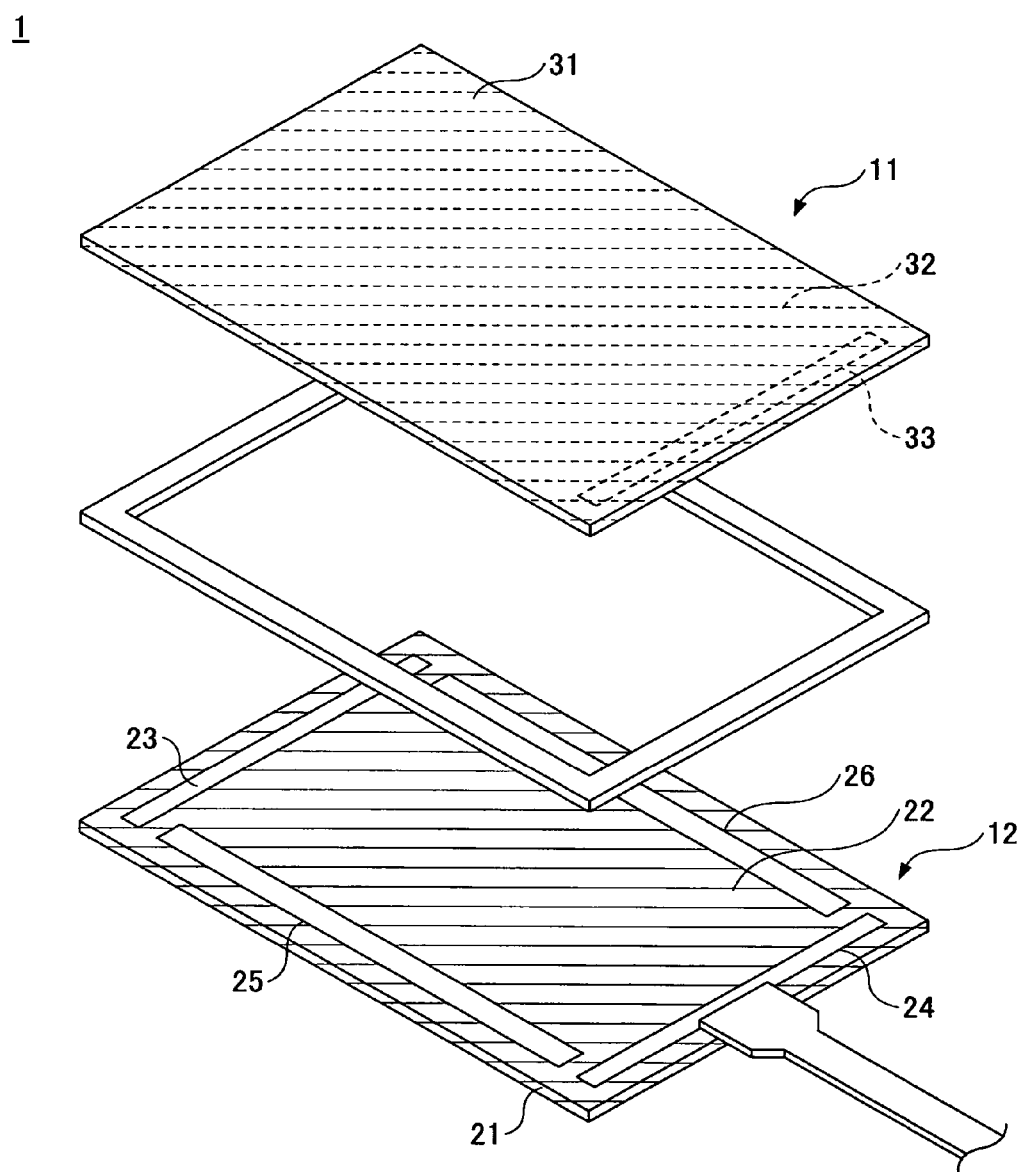
FIG. 12 is an exploded perspective view of a conventional five-line type resistance film touch panel.

Next, referring to FIG. 11, a manufacturing process of the lower substrate 121 according to the first embodiment of the present invention is described. FIG. 11 is a diagram showing the manufacturing process of the lower substrate 121 according to the first embodiment of the present invention.

First, as shown in FIG. 11(a), a transparent resistance film 132 is formed on a glass substrate 131 by sputtering a material such as ITO or vacuum deposition of a material such as ITO.

Next, as shown in FIG. 11(b), a first insulation film 133 having openings 141 is formed by pattern printing and baking.

Next, as shown in FIG. 11(c), a common electrode 134 is printed on the first insulation film 133 by using Ag—C, for example, and baking is applied thereto. The common electrode 134 is also formed in the openings 141 and is connected to the transparent resistance film 132 via the openings 141.

Next, as shown in FIG. 11(d), a second insulation film 135 having a first through hole 151-1 through a fourth through hole 151-4 is printed on the common electrode 134 by patterning, and baking is applied thereto.

Next, as shown in FIG. 11(e), first wiring 136-1 through fourth wiring 136-4 are printed on the second insulation film 135 by patterning of Ag, for example, and baking is applied thereto. In addition, as shown in FIG. 11(f), a third insulation film 137 is printed on the second insulation film 135 to cover the first wiring 136-1 through the fourth wiring 136-4 by patterning, and baking is applied thereto.

With the above, the lower substrate 121 is formed.

In this, when a low resistance layer 321 of a low resistance material, for example, Ag, is formed in the openings 141, after the process shown in FIG. 11(b), the low resistance material is printed in the openings 141 and baking is applied thereto.

Further, the present invention is not limited to these embodiments, but various variations and modifications may be made without departing from the scope of the present invention.

The present application is based on Japanese Priority Application No. 2005-204778 filed on Jul. 13, 2005, with the Japanese Patent Office, the entire contents of which are hereby incorporated by reference.

What is claimed is:

1. A coordinate detecting device, comprising:
   a resistance film;
   a common electrode which applies electric potential to the resistance film;
   a voltage supplying section which supplies a voltage to the common electrode;
   wiring which supplies the voltage to the voltage supplying section;
   an insulation film disposed between the common electrode and the resistance film; and
   an electric potential supplying section formed in the insulation film for supplying the electric potential from the common electrode to the resistance film, wherein
   openings, which become the electric potential supplying section, are formed at outer side parts of the insulation film,
   a first distance between the openings at ends of the outer side parts being smaller than a second distance between the openings at a center of the outer side parts, and
   the coordinate detecting device detects a coordinate of a position on a panel when a user touches the position while an electric potential distribution is generated in the resistance film by being applied electric potential from the common electrode,
   wherein the openings are aligned along the outer side parts corresponding to each side of the panel.

2. The coordinate detecting device as claimed in claim 1, wherein:
   the voltage supplying section is formed in a through hole formed in an insulation film disposed above the common electrode and a part of the wiring is disposed in the through hole.

3. The coordinate detecting device as claimed in claim 1, wherein:
   the number, and/or the size, and/or the shape of the openings are determined so that the electric potential distribution in the resistance film becomes a predetermined electric potential distribution.

4. The coordinate detecting device as claimed in claim 3, wherein:
   the number, and/or the size, and/or the shape of the openings are determined so that an area where the common electrode contacts the resistance film via the openings is large at the end parts of the electric potential supplying section and is small at the center part thereof.

5. The coordinate detecting device as claimed in claim 1, wherein:
   the length of the openings is different so that the electric potential distribution in the resistance film becomes a predetermined electric potential distribution.

6. The coordinate detecting device as claimed in claim 1, wherein:
   the shape of the openings is the same but the pitch between the openings is different so that the electric potential distribution in the resistance film becomes a predetermined electric potential distribution.

7. The coordinate detecting device as claimed in claim 1, wherein:
the shape of the openings is the same but the electric potential supplying section is curved so that the electric potential distribution in the resistance film becomes a predetermined electric potential distribution.

8. The coordinate detecting device as claimed in claim 1, wherein:
the shape of the openings is the same but the number of the openings is different depending on positions in the electric potential supplying section so that the electric potential distribution in the resistance film becomes a predetermined electric potential distribution.

9. The coordinate detecting device as claimed in claim 8, wherein:
the openings are disposed in plural at the end parts of the electric potential supplying section in the orthogonal direction to the electric potential supplying section.

10. The coordinate detecting device as claimed in claim 1, wherein:
the openings are filled with the common electrode.

11. The coordinate detecting device as claimed in claim 1, wherein:
the openings are filled with a low resistance conductive material.

12. The coordinate detecting device as claimed in claim 1, wherein:
the common electrode is disposed linearly.

13. The coordinate detecting device as claimed in claim 1, wherein:
the common electrode is disposed non-linearly.

14. The coordinate detecting device as claimed in claim 2, wherein:
the wiring is stacked on the common electrode via the insulation film.

15. A coordinate detecting device, comprising:
a resistance film;
a common electrode which applies electric potential to the resistance film;
a voltage supplying section which supplies a voltage to the common electrode;
wiring which supplies the voltage to the voltage supplying section;
an insulation film disposed between the wiring and the common electrode; and
an electrical potential supplying section formed in the insulation film for supplying the electrical potential from the common electrode to the resistance film, wherein
openings, which becomes the electric potential supplying section, are formed at outer side parts of the insulation film,
a first distance between the openings at ends of the outer side parts being smaller than a second distance between the openings at a center of the outer side parts, and
the voltage supplying section is formed in a through hole formed in the insulation film, and the wiring is stacked on the common electrode via the insulation film, and the coordinate detecting device detects a coordinate of a position on a panel when a user touches the position while an electric potential distribution is generated in the resistance film by being applied electric potential from the common electrode,
wherein the openings are aligned along the outer side parts corresponding to each side of the panel.

16. A coordinate detecting device, comprising:
an electric potential supplying layer for supplying electric potential from a common electrode to a resistance film of the coordinate detecting device; wherein
the electric potential supplying layer includes an insulation film and an electric potential supplying section in the insulation film;
the electric potential supplying section is formed at openings formed at outer side parts of the insulation film; and
a first distance between the openings at ends of the outer side parts being smaller than a second distance between the openings at a center of the outer side parts,
wherein the openings are aligned along the outer side parts corresponding to each side of the panel.

* * * * *